United States Patent [19]

Smith

[11] Patent Number: 4,775,212

[45] Date of Patent: Oct. 4, 1988

[54] OPTICAL FIBER CABLE

[75] Inventor: Dennis K. Smith, Fort Worth, Tex.

[73] Assignee: Honeywell, Inc., Phoenix, Ariz.

[21] Appl. No.: 720,125

[22] Filed: Apr. 4, 1985

Related U.S. Application Data

[63] Continuation of Ser. No. 586,496, Mar. 5, 1984, abandoned.

[51] Int. Cl.[4] .............................................. G02B 6/44
[52] U.S. Cl. .................................................. 350/96.23
[58] Field of Search ................ 350/96.20, 96.21, 96.23

[56] References Cited

U.S. PATENT DOCUMENTS 4,405,200  9/1983  Hoffman et al. ................. 350/96.21
4,447,120  5/1984  Borsuk ............................. 350/96.23

Primary Examiner—William L. Sikes
Assistant Examiner—Robert E. Wise
Attorney, Agent, or Firm—A. A. Sapelli; D. J. Lenkszus; A. Medved

[57] ABSTRACT

The present invention relates to a cable for transmitting light signals and electrical signals. In optical fiber cables steel wires are added to strengthen the cable. The present invention utilizes the steel wires or any other electrically conductive wires to couple electrical signals or to provide power to remote devices attached to a central station.

2 Claims, 2 Drawing Sheets

OPTICAL FIBER CABLE

This is a continuation of co-pending application Ser. No. 586,496 filed on Mar. 5, 1984, now abandoned.

BACKGROUND OF THE INVENTION

The present invention relates to light transmitting fibers, and more particularly, to an optical fiber cable including electrical conductors which can be utilized to provide power to remote devices.

Present day optical fibers which are used for communications typically consist of a glass core having a diameter in the thousands of an inch. Surrounding the glass core is a layer of glass or plastic, generally referred as a cladding, which keeps the light waves within the glass core. Polyurethane jackets are added to the fiber to protect it from abrasion, crushing, chemicals, and the environment. Individual fibers are often grouped to form cables. A typical fiber cable can contain 1 to 24 of these fibers plus in some cases a steel wire that adds strength to the cable. The addition of this steel wire is especially important when cables are to be pulled through conduits, pipes, duct work or air vents, etc.

In many telecommunications applications, computer applications, . . . , it may be desirable to remotely power devices which interface with a central switch center, central processing unit, . . . , respectively. In order to provide power to the remote devices, a separate conductive cable must be provided. Providing the extra cable can present an additional cost for both the extra cable and for the installation of the extra cable, and can also present a severe problem if the extra cable is to be passed through a wall or bulkhead opening in which the opening has a fixed size.

The present invention provides a means for providing the conductive cabling, while providing the strengthening function, for supplying power to remote devices without requiring the need to have a separate conductive cable thereby eliminating additional costs and space problems.

SUMMARY OF THE INVENTION

Therefore, there is supplied by the present invention a cable for transmitting light signals which comprises at least one light transmitting fiber and at least one electrically conductive wire. A plurality of connectors are included wherein at least one end of each of the light transmitting fibers is operatively connected to a corresponding connector. At least one end of at least one of the electrically conductive wires is operatively connected to a predetermined connector having one of the light transmitting fibers operatively connected thereto.

Accordingly, it is an object of the present invention to provide a cable for transmitting light signals and electrical signals.

This and other objects of the present invention will become more apparent when taken in conjunction with the following description and attached drawings, wherein like characters indicate like parts, and which drawings form a part of the present application.

DETAILED DESCRIPTION

Figure 1:
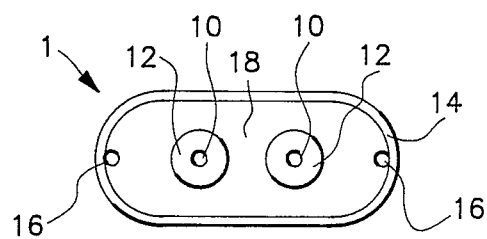
FIG. 1 shows a cross section of a typical optical fiber cable of the prior art.

Referring to FIG. 1, there is shown a cross section of a typical optical fiber (or also referred to herein as fiber optic) cable 1 of the prior art having two optical fibers 10. The optical fibers 10 are surrounded by a cladding 12 which keeps the light waves within the respective optic fiber 10. Both optic fibers 10 and the corresponding cladding 12 of the fiber cable 1 are enclosed in an outer jacket 14. Also, enclosed within the outer jacket 14 are two steel wires 16 for providing strength to the fiber cable 1 and some buffer (or cushion) material 18 to protect the cable from crushing.

Figure 2:
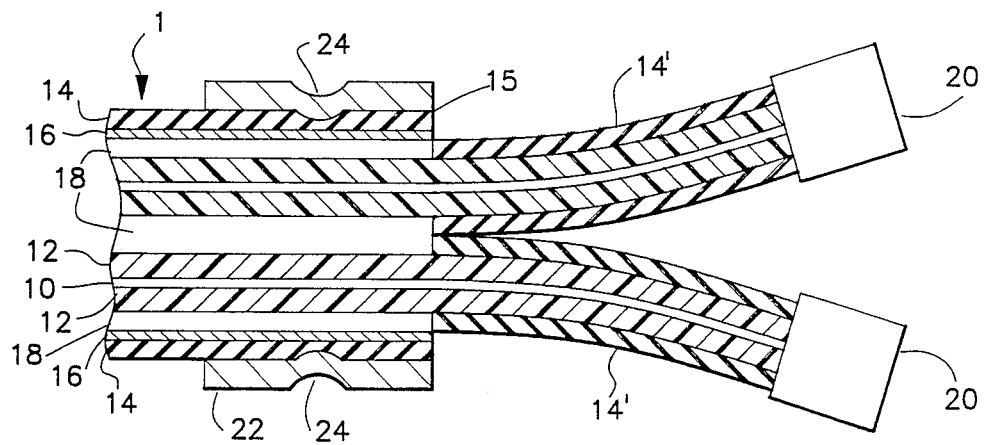
FIG. 2 shows a cross section along the length of the cable of FIG. 1 of the prior art.

The optical fiber 10 and corresponding cladding 12 are separated at the end of the optical fiber cable 1 and a connector 20 attached to the end of the optical fiber 10 as shown in FIG. 2. FIG. 2 shows a cross section along the length of the optical fiber cable 1 of FIG. 1 of the prior art at one end of the optical fiber cable 1. At the end of the optical fiber cable 15, each optical fiber 10 and corresponding cladding 12 are extended a predetermined amount necessary to reach a corresponding predetermined mating connector (not shown) on a panel or the like (not shown). As mentioned above connectors 20 are attached to the optical fiber 10 in a manner well known in the art. Each optical fiber 10 and cladding 12 extended from the end of the cable 1 is enclosed in a corresponding protective jacket 14'. At the end of the optical fiber cable 15, the steel wires 16, the outer jacket 14, and the buffer material 18, are terminated. At the end of the cable 15, a sleeve 22 is placed around the cable and a crimp 24 is made to the sleeve 22 thereby holding the sleeve in position at the end of the cable in a manner as shown in FIG. 2. In the termination of the optical fiber cable 1 of the prior art, the steel wires 16 are isolated, that is, no connections are made to the steel wires.

Figure 3:
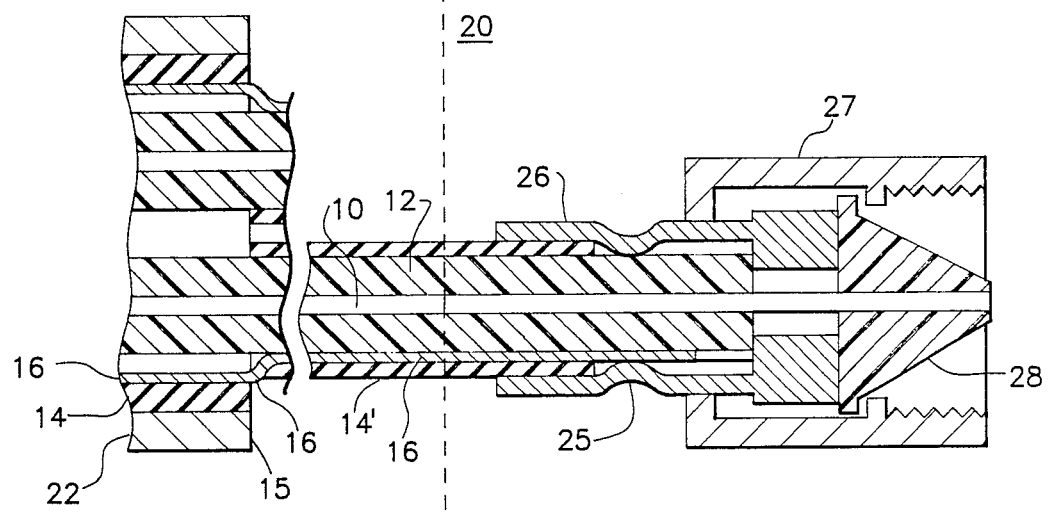
FIG. 3 shows a coupling device at an end of the optical fiber cable of the preferred embodiment of the present invention which includes the coupling of an electrical signal.

Coupling devices of the optical fiber cable 1 of the preferred embodiment of the present invention is shown in FIG. 3. At the end of the optical fiber cable 15, steel wire 16 is extended to the connector 20 along with the optical fiber 10 and corresponding cladding 12, and all are enclosed in protective jacket 14'. The connector 20 is shown comprising a connector sleeve 26, a connector nut 27, and ferrule 28. The protective jacket 14' is inserted into connector 20 and is terminated at a point which exposes the steel wire 16 sufficient to permit a crimp 25 of the connector sleeve 26 to contact the steel wire 16. The connector nut 27 which is in contact with the connector sleeve 26 permits any electrical power or any electrical signals supplied to the steel wire 16 at the other end of the optical fiber cable 1 to be transmitted to a mating connector (not shown) of the remote device. It is understood by those skilled in the art that the connector sleeve 26, the connector nut 27, and the mating connector (not shown), are made of a metallic material (or made of an electrically conducting material) and further the steel wire 16 of the optical fiber cable 1 need not be steel but be made up of any electrical conducting material. Since the optical fiber 10 is a dielectric rather than a metal, the optical fiber 10 does not act as an antenna and pick up or radiate radio-frequency interference (RFI), electromagnetic interference (EMI), or elsctromagentic pulses (EMP). The optical fiber 10 is immune from interference caused by lightning, nearby electric motors, relays, and many other electrical noise generators which induce problems on metallic cables unless shielded and filtered. Thus, any optical signal being transmitted on optical fiber 10 is not interferred with by the proximity of any electrical signals being carried on steel wire 16.

Figure 4:
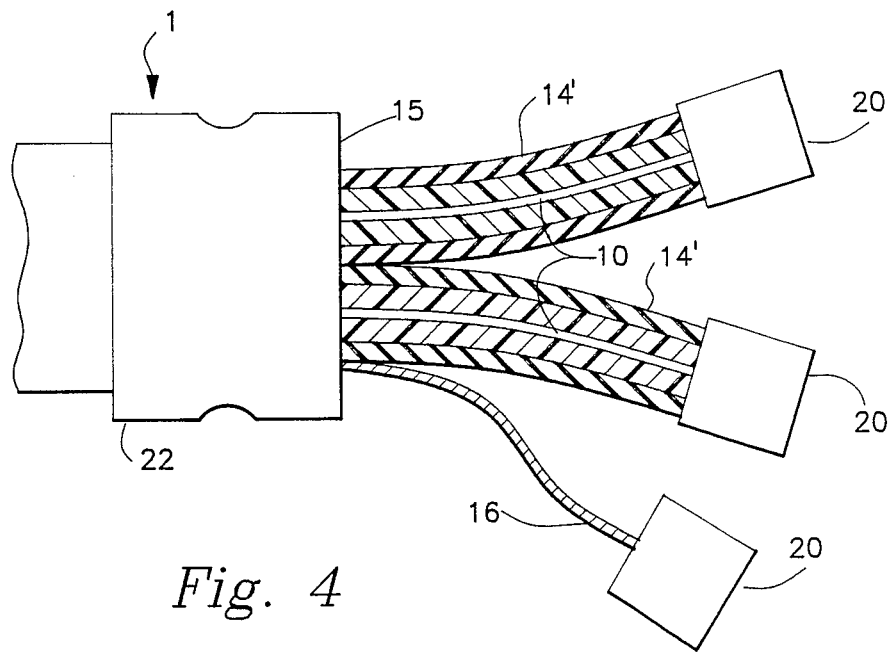
FIG. 4 shows an alternative embodiment of the coupling of the electrical signal at the end of the optical fiber cable.

In an alternative embodiment shown in FIG. 4, the steel wire 16 need not utilize the connector 20 which is also utilized to connect the optical fiber 10. The steel wire 16 is connected to a separate connector 20 which can couple any electrical signal transmitted on the steel wire 16 to the remote device. Although not shown, the steel wire 16 can be insulated or shielded as desired.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A cable for transmitting light signals comprising:
(a) at least one light transmitting fiber;
(b) at least one electrically conductive wire; and
(c) at least one connector means, having a connector nut made of an electrically conductive material, for engaging with a corresponding mating connector, wherein the end of each of said light transmitting fiber is operatively connected to a predetermined one of said connector means, and wherein the end of each of said electrically conductive wire is operatively connected to a preselected one of said connector means, and further wherein at least one of said electrically conductive wire is electrically connected to the associated connector nut of said connector.

2. A cable for transmitting light signals comprising:
(a) at leat one light transmitting fiber;
(b) at least one electrically conductive wire; and
(c) at least one connector means, said connector means comprising an exterior connector body and an interior portion providing a corresponding mating contact point for said light transmitting fiber, said exterior connector body being made of an electrically conductive material, for engaging with a corresponding mating connector, wherein the end of each of said light transmitting fiber is operatively connected to a predetermined one of said connector means, and wherein the end of each of said electrically conductive wire is operatively connected to a preselected one of said connector means, and further wherein at least one of said electrically conductive wire is electrically connected to the associated exterior connector body of said connector means.

* * * * *